UNITED STATES PATENT OFFICE.

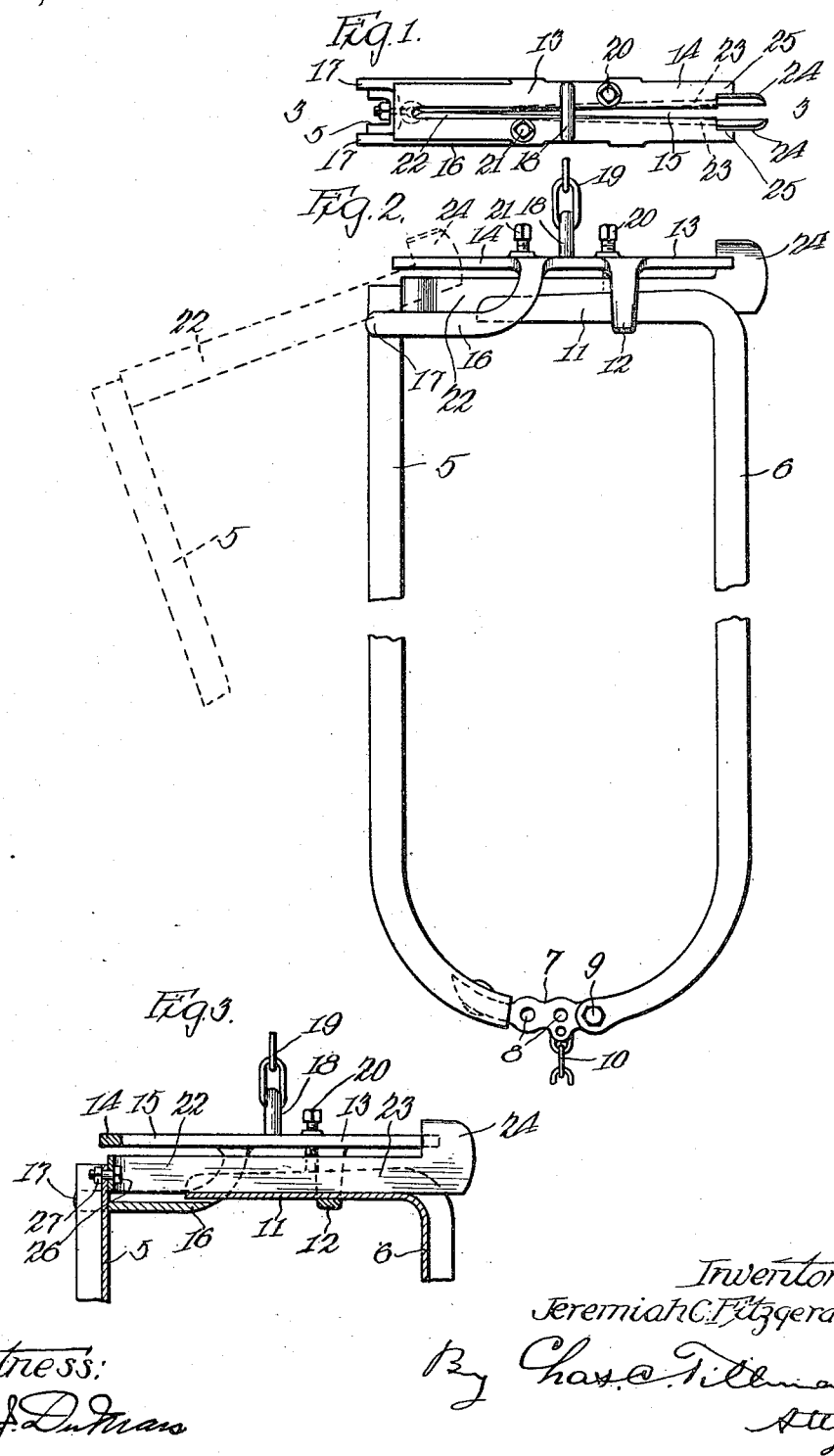
J. C. FITZGERALD.
CATTLE STANCHION.
APPLICATION FILED MAR. 15, 1916.
1,205,182.
Patented Nov. 21, 1916.

JEREMIAH C. FITZGERALD, OF KILBOURN, WISCONSIN.

CATTLE-STANCHION.

1,205,182.   Specification of Letters Patent.   Patented Nov. 21, 1916.

Application filed March 15, 1916. Serial No. 84,279.

*To all whom it may concern:*

Be it known that I, JEREMIAH C. FITZGERALD, a citizen of the United States, and resident of Kilbourn, in the county of Columbia and State of Wisconsin, have invented certain new and useful Improvements in Cattle-Stanchions, of which the following is a specification.

This invention relates to new and useful improvements in cattle stanchions, and has for its main object to provide a stanchion of very simple and inexpensive construction, the parts of which can be easily adjusted to accommodate or receive and comfortably hold animals having necks of different sizes, and also to provide simple and efficient means to permit of the neck-bars of the stanchion being easily separated to release the animal or to securely hold them against separation when clamped on the animal's head.

Other objects and advantages of the invention will be disclosed in the subjoined description and explanation.

The invention consists in certain peculiarities of the construction, novel arrangement and operation of the various parts as will be hereinafter more fully set forth and specifically claimed.

In the accompanying drawing, which serves to illustrate an embodiment of the invention, Figure 1 is a plan view of a stanchion, illustrating the neck bars thereof in their closed and locked positions. Fig. 2 is a side view in elevation, shortened for the convenience of illustration, and illustrating the neck-bars by continuous lines in the positions they will occupy when the animal's neck is held thereby, and by dotted lines one of the positions to which one of the neck-bars may be moved to release the neck of the animal and Fig. 3 is a vertical sectional view taken on line 3—3 of Fig. 1 showing the upper portion of the stanchion.

Like numerals of reference refer to corresponding parts throughout the different views of the drawing.

The neck-bars of the stanchion are indicated by the reference numerals 5 and 6 and said neck-bars are by preference made of metal and substantially U-shaped in cross-section and have their channels presented outwardly as is clearly shown in Fig. 3 of the drawing, thus affording rounded surfaces adjacent to the animal's neck, when the same is confined between the neck-bars. The neck-bar 5 has secured to its lower end an arm 7 which is extended toward the lower portion of the neck-bar 6 and is provided with a series of openings 8 to receive a bolt 9 which is extended through suitable openings in the lower part of the neck-bar 6 and one of the openings 8 in the arm 7, by means of which arrangement it is evident that the bars 5 and 6 may be adjusted toward or from each other as may be desired, by removing the bolt 9 from one of the openings 8 and securing the lower end of the bar 6 to the arm 7 in another one of the said openings. The lower portions of each of the arms 5 and 6 are by preference inwardly curved as shown in Fig. 2 of the drawing. Loosely connected to the arm 7 is a chain section 10 which may be secured to the floor of the stall or other suitable support, not shown, so as to permit of the movement of the neck-bars. The bar 6 is provided at its upper end with a horizontal extension 11 which projects toward the bar 5 through a depending loop 12 on the adjusting support, which support is designated as a whole by the reference numeral 13 and is preferably made of metal and consists of a horizontally disposed plate 14 having a longitudinally extended slot 15 which is closed at one of its ends but open at its other end. The adjustable support 13 also includes the depending loop 12 and another depending loop or sleeve 16 which projects at its free end a slight distance beyond the end of the plate 14 in which the closed end of the slot 15 is located as will be readily understood by reference to Figs. 1 and 3 of the drawing. The said projecting or free end of the loop 16 is provided with prongs 17 between which the upper end of the neck-bar 5 will rest when said bar is in its closed position, as shown by continuous lines in the drawing. The horizontal portion of the loop or member 16 is located at a sufficient distance below the plate 14 of the adjusting support to allow the free end of the neck-bar extension 11 to extend into the inner portion of said loop. At about its middle the plate 14 is provided on its upper surface with an upwardly extended loop 18 to which a section of a chain 19 may be connected, the other end of which chain may be fastened to an elevated support, not shown, so as to suspend the stanchion.

Extended vertically through the plate 14 of the adjusting support are a pair of set screws 20 and 21, which, as shown in Fig. 1 are located on opposite sides of the slot 15 and opposite sides of the loop 18 and in such relation with respect to the horizontal portion 11 of the neck-bar 6 as to engage the upwardly extended sides of the extension 11 so as to firmly unite said extension and the adjusting support. By means of the set screws 20 and 21 it is obvious that the upper portions of the neck-bars can be adjusted toward or from each other to suit the different size necks of animals.

Located for longitudinal movement within the loop 12 and loop or sleeve 16 of the adjusting support, and below the plate 14, is a locking arm or member 22, which, in the present instance is shown as being made of a single piece of resilient material bent back upon itself at about its middle to provide two prongs 23, which are located alongside of one another, but slightly diverged toward their free ends, each of which free ends is provided with an upwardly extended enlargement 24 or catch, the upper portions of which project somewhat above the upper surface of the plate 14 which has in each side of the open end of the slot 15 therein a recess or stop 25 with which the enlargement or catches 24 engage. That end of the member 22 adjacent to the neck bar 5 is loosely connected to the upper portion of said bar by means of a bolt 26 and nut 27 which bolt is extended through suitable openings in the said member, and said bar. The members 23 of the locking arm or member 22 are normally separated at their free ends as shown in Fig. 1, but by pressing on the enlargements or catches 24 so as to force them toward each other, it is apparent that they will be disengaged from the recess or stop 25 in the plate 14, thus allowing said enlargements to slide freely in the slot 15, when the bar 5 is moved outwardly, until said catches strike the closed end or stop of the slot 15 which will prevent the further outward movement of the bar 5, but will hold it in such position that it can be readily returned to its normal or locking position as shown in Fig. 2 by continuous lines, when it is apparent the enlargements 24 will automatically spring into the recesses 25 and lock the bars 5 and 6 securely together around the neck of the animal.

Having thus fully described my invention, what I claim as new and desire to secure by Letters Patent is:—

1. A stanchion consisting of a pair of neck-bars, made of channeled material hingedly connected at their lower portions and opening and closing at their upper portions, the upper portion of one of said bars being extended substantially horizontally toward the upper end of the other bar, a horizontally located support adjustably mounted on said extension and having a longitudinal slot provided at one of its ends with recesses and closed at its other end, a hair-pin shaped member connected to the upper end of the last named bar and adapted to operate in said slot when the last named bar is moved from and toward the other bar, and coöperating means on the support and said member, whereby the neck-bars will be automatically locked in their closed positions by reason of the recesses at one end of said slot and against unlimited separation in their open positions, by reason of the closed end of said slot.

2. A stanchion consisting of a pair of neck-bars hingedly connected at their lower portions, of a lateral channeled extension on the upper portion of one of said bars projecting toward the other bar, the said channel having its upper portion open, a longitudinally slotted member having at its upper middle portion a transversely disposed loop for engagement with a chain or other suspending device, the slot of said member being closed at one end and open at its other end, said member having transversely extended loops one of which is provided at its outer end with a recess for one of said neck-bars, a locking member connected to the upper end of the neck-bar adapted to fit in the said recess, and having at its free end upturned projections, said projections adapted to pass through the upper loop of said support, a set-screw located in the upper portion of said support on each side of the slot therein, and adapted to engage the upturned edges of the extension on the other neck-bar.

JEREMIAH C. FITZGERALD. [L. S.]

Witnesses:
A. C. TENNISON,
R. D. BARNEY.

Copies of this patent may be obtained for five cents each, by addressing the "Commissioner of Patents, Washington, D. C."